United States Patent
Shin et al.

(10) Patent No.: US 11,489,203 B2
(45) Date of Patent: Nov. 1, 2022

(54) ELECTROLYTE FOR LITHIUM SECONDARY BATTERY AND LITHIUM SECONDARY BATTERY INCLUDING SAME

(71) Applicant: LG Chem, Ltd., Seoul (KR)

(72) Inventors: Won Kyung Shin, Daejeon (KR); Kyoung Ho Ahn, Daejeon (KR); Chui Haeng Lee, Daejeon (KR); Min Jung Kim, Daejeon (KR); Gwang Yeon Kim, Daejeon (KR)

(73) Assignee: LG Energy Solution, Ltd.

( * ) Notice: Subject to any disclaimer, the term of this patent is extended or adjusted under 35 U.S.C. 154(b) by 13 days.

(21) Appl. No.: 16/771,561

(22) PCT Filed: Jul. 4, 2019

(86) PCT No.: PCT/KR2019/008238
§ 371 (c)(1),
(2) Date: Jun. 10, 2020

(87) PCT Pub. No.: WO2020/009505
PCT Pub. Date: Jan. 9, 2020

(65) Prior Publication Data
US 2021/0151800 A1   May 20, 2021

(30) Foreign Application Priority Data
Jul. 4, 2018   (KR) .................... 10-2018-0077764

(51) Int. Cl.
| | |
|---|---|
| *H01M 10/0568* | (2010.01) |
| *H01M 4/505* | (2010.01) |
| *H01M 4/525* | (2010.01) |
| *H01M 10/0565* | (2010.01) |
| *H01M 10/0567* | (2010.01) |
| *H01M 10/0569* | (2010.01) |
| *H01M 4/02* | (2006.01) |

(52) U.S. Cl.
CPC ....... *H01M 10/0568* (2013.01); *H01M 4/505* (2013.01); *H01M 4/525* (2013.01); *H01M 10/0565* (2013.01); *H01M 10/0567* (2013.01); *H01M 10/0569* (2013.01); *H01M 2004/028* (2013.01); *H01M 2300/0034* (2013.01); *H01M 2300/0037* (2013.01); *H01M 2300/0082* (2013.01); *H01M 2300/0085* (2013.01)

(58) Field of Classification Search
None
See application file for complete search history.

(56) References Cited

U.S. PATENT DOCUMENTS

| | | | |
|---|---|---|---|
| 9,806,379 B2 | 10/2017 | Lim et al. | |
| 2007/0287071 A1* | 12/2007 | Chiga | H01M 10/0569 429/200 |
| 2012/0141878 A1 | 6/2012 | Ohashi et al. | |
| 2013/0177819 A1 | 7/2013 | Han | |
| 2016/0344063 A1 | 11/2016 | Chang et al. | |
| 2018/0342767 A1 | 11/2018 | Ahn et al. | |
| 2019/0074545 A1 | 3/2019 | Jeong et al. | |

FOREIGN PATENT DOCUMENTS

| | | |
|---|---|---|
| JP | 2003100343 A | 4/2003 |
| JP | 2009256597 A | 11/2009 |
| KR | 20110010516 A | 2/2011 |
| KR | 20130081577 A | 7/2013 |
| KR | 20150019259 A | 2/2015 |
| KR | 101679719 B1 | 11/2016 |
| KR | 20160136686 A | 11/2016 |
| KR | 20180026358 A | 3/2018 |
| KR | 20180066724 A | 6/2018 |
| WO | 2010143658 A1 | 12/2010 |
| WO | 2018131952 A1 | 7/2018 |

OTHER PUBLICATIONS

International Search Report for Application No. PCT/KR2019/008238 dated Oct. 10, 2019. 2 pages.

* cited by examiner

*Primary Examiner* — Laura Weiner
(74) *Attorney, Agent, or Firm* — Lerner, David, Littenberg, Krumholz & Mentlik, LLP

(57) ABSTRACT

An electrolyte for a lithium secondary battery, and a lithium secondary battery including the same are disclosed herein. In some embodiments, an electrolyte includes a lithium salt having a concentration of 1.6 M to 5 M, an oligomer including a unit represented by Formula A, and an organic solvent including a cyclic carbonate-based compound and an acetate-based compound, wherein the cyclic carbonate-based compound is present in an amount of 6 vol % to 19 vol % based on the total volume of the organic solvent.

9 Claims, No Drawings

ELECTROLYTE FOR LITHIUM SECONDARY BATTERY AND LITHIUM SECONDARY BATTERY INCLUDING SAME

CROSS-REFERENCE TO RELATED APPLICATIONS

The present application is a national phase entry under 35 U.S.C. § 371 of International Application No. PCT/KR2019/008238, filed on Jul. 4, 2019, claims priority from Korean Patent Application No. 10-2018-0077764, filed on Jul. 4, 2018, the disclosures of which are incorporated by reference herein.

TECHNICAL FIELD

The present invention relates to an electrolyte for a lithium secondary battery and a lithium secondary battery including the same, and more particularly, to an electrolyte for a lithium secondary battery having excellent output properties, low-temperature properties, and room temperature and high-temperature lifespan properties by using a lithium salt of a high concentration, and a lithium secondary battery including the same.

BACKGROUND ART

The application of a lithium secondary battery is rapidly expanding not only as a portable power source for a mobile phone, a notebook computer, a digital camera, a camcorder, and the like but also as a medium-and-large-sized power source for a power tool, an electric bicycle, a hybrid electric vehicle (HEV), a plug-in HEV (PHEV), and the like. In accordance with the expansion of the application fields and the increase in demand thereof, the external shape and size of the battery are variously changed, and performance and stability which are more excellent than those required in conventional small batteries are required. In order to meet the demands, battery components should be made to ensure that the performance implementation of the battery is stably achieved under a condition in which a high current flows.

The lithium secondary battery is manufactured by using a material capable of intercalation and de-intercalation of lithium ions as a positive electrode and a negative electrode, selectively including a separator between the two electrodes, and placing an electrolyte between the electrodes, and electricity is generated or consumed by an oxidation reduction reaction caused by intercalation and de-intercalation of lithium ions in the negative electrode and the positive electrode.

Meanwhile, in accordance with the recent expansion of the application fields thereof, the utilization and importance of a lithium secondary battery are gradually increasing, especially in an environment in which high power is required, such as HEV/PHEV, and the improvement in output properties of the battery is required. The output properties of a battery is a measure of how much current is allowed to flow at a given voltage. In general, the output that can be obtained from a battery when a current is increased tends to increase initially but decrease after reaching a maximum value. This is related to a polarization phenomenon. When the current is increased to a certain value or greater, a battery voltage is reduced, and capacity that can be obtained in a given voltage range is also reduced. Since this polarization phenomenon is related to the diffusion rate of lithium ions and the internal resistance of the battery, it is necessary to improve the diffusion rate and electrical conductivity properties of lithium ions in order to improve the output properties of the battery.

In recent years, as a method to improve the output properties of a battery, a method in which an electrolyte containing a lithium salt of a high concentration is used to increase the yield of lithium ions (Li+ transference number) and the dissociation of lithium ions, thereby improving the output properties of a battery, has been devised. At this time, when a lithium salt of a high concentration is used, as the concentration of lithium ions increases, the freezing point of the electrolyte is lowered. Therefore, the phase of the electrolyte does not change under low temperature conditions but is maintained constant, so that the low-temperature properties of a lithium secondary battery may be improved.

Also, when a lithium salt of a high concentration is used, the amount of a free solvent not bonding with lithium ions is reduced, so that high-temperature safety may be improved. Specifically, when a battery is charged, lithium may be de-intercalated from a positive electrode active material, and thus, is structurally unstable. When exposed to high temperature conditions, the structure may be collapsed, so that oxygen radicals may be generated. The oxygen radicals generated at this time are highly reactive, and thus, may react with a free solvent that is not bonded with lithium ions to cause an exothermic reaction. In this case, when a lithium salt of a high concentration is used in an electrolyte, the amount of the free solvent is reduced, thereby suppressing the exothermic reaction, so that the high-temperature safety of the battery may be improved.

However, when a lithium salt of a high concentration is used, the viscosity of an electrolyte is increased. At this time, since the mobility of ions in the electrolyte is inversely proportional to the viscosity of the electrolyte in accordance with the law of Stokes, it may cause a problem in that the ion conductivity of the electrolyte is rather deteriorated.

Therefore, an electrolyte for a lithium secondary battery is required which uses a lithium salt of a high concentration to maintain the ion conductivity of the battery at a predetermined level or higher while improving the output properties, low-temperature properties, and the like of the battery.

(Patent Document 1) Korean Patent Laid-Open Publication No. 10-2011-0010516

DISCLOSURE OF THE INVENTION

Technical Problem

An aspect of the present invention provides a lithium secondary battery having excellent output properties, low-temperature properties, and room temperature and high-temperature lifespan properties by using a lithium salt of a high concentration.

Technical Solution

According to an aspect of the present invention, there is provided an electrolyte for a lithium secondary battery, the electrolyte including a lithium salt at a concentration of 1.6 M to 5 M, an oligomer including a unit represented by Formula A, and an organic solvent including a cyclic carbonate-based compound and an acetate-based compound, wherein the cyclic carbonate-based compound is included in an amount of 6 vol % to 19 vol % based on the total volume of the organic solvent.

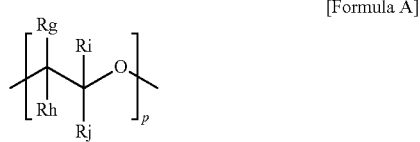

[Formula A]

In Formula A, $R_g$, $R_h$, $R_i$, and $R_j$ are each independently fluorine, or an alkyl group having 1 to 3 carbon atoms which is unsubstituted or substituted with fluorine, and p is an integer of 1 to 10.

At this time, the oligomer including a unit represented by Formula A above may be an oligomer represented by Formula 1 below.

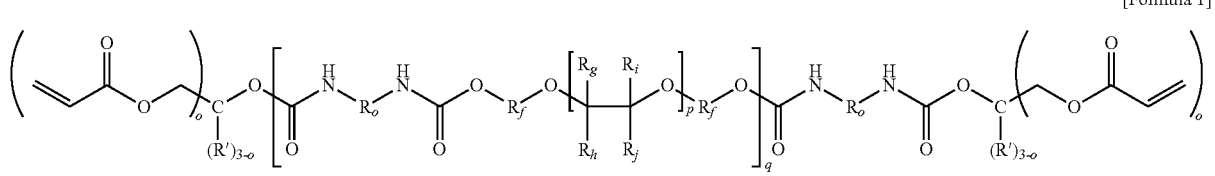

[Formula 1]

In Formula 1, $R_f$ is an alkylene group having 1 to 5 carbon atoms which is unsubstituted or substituted with fluorine, $R_g$, $R_h$, $R_i$, and $R_j$ are each independently fluorine, or an alkyl group having 1 to 3 carbon atoms which is unsubstituted or substituted with fluorine, $R_0$ is an aliphatic hydrocarbon group or an aromatic hydrocarbon group, R' is hydrogen or an alkyl group having 1 to 3 carbon atoms, and o is an integer of 1 to 3, p is an integer of 1 to 10, and q is an integer of 1 to 15.

The acetate-based compound may be included in an amount of 81 vol % to 94 vol % based on the total volume of the organic solvent.

The cyclic carbonate-based compound may be one or more selected from the group consisting of ethylene carbonate, propylene carbonate, 1,2-butylene carbonate, 2,3-butylene carbonate, 1,2-pentylene carbonate, 2,3-pentylene carbonate, vinylene carbonate, fluoroethylene carbonate, and difluoroethylene carbonate.

The acetate-based compound may be one or more selected from the group consisting of methyl acetate, ethyl acetate, and propyl acetate.

According to another aspect of the present invention, there is provided a lithium secondary battery including a positive electrode containing a positive electrode active material represented by $Li_a(Ni_{x1}Co_{y1}Mn_{z1})O_2$ ($0.45 \le x1 \le 0.9$, $0.05 \le y1 \le 0.5$, $0.05 \le z1 \le 0.5$, $0.8 \le a \le 1.2$), a negative electrode, and the electrolyte for a lithium secondary battery.

Advantageous Effects

An electrolyte for a lithium secondary battery according to the present invention uses a lithium salt of a high concentration, and thus, has a high dissociation degree of lithium ions, so that the output properties of the battery may be improved and the low-temperature properties of the battery and the lifespan properties thereof at room temperature and high temperatures may be improved.

BEST MODE FOR CARRYING OUT THE INVENTION

Hereinafter, the present invention will be described in more detail.

It will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

Electrolyte for Lithium Secondary Battery

An electrolyte for a lithium secondary battery according to the present invention includes a lithium salt at a concentration of 1.6 M to 5 M, an oligomer including a unit represented by Formula A, and an organic solvent including a cyclic carbonate-based compound and an acetate-based compound, wherein the cyclic carbonate-based compound is included in an amount of 6 vol % to 19 vol % based on the total volume of the organic solvent.

The lithium salt may be included at a concentration of 1.6 M to 5 M, preferably 1.6 M to 4 M, more preferably 1.6 M to 3 M in the electrolyte for a lithium secondary battery. When the lithium salt is included in the above range, lithium ions are sufficiently supplied to improve the yield of lithium ions ($Li^+$ transference number) and the dissociation of lithium ions, so that the output properties of the battery may be improved, and the freezing point (melting point) of the electrolyte is lowered to prevent the phase of the electrolyte from being changed even under low temperature conditions, so that the low-temperature safety of a lithium secondary battery may be improved.

Also, when a lithium salt of a high concentration is used, the amount of a free solvent not bonding with lithium ions is reduced, so that high-temperature safety may be improved. Specifically, when a battery is charged, lithium may be de-intercalated from a positive electrode active material, and thus, is structurally unstable. When exposed to high temperature conditions, the structure may be collapsed, so that oxygen radicals may be generated. The oxygen radicals generated at this time are highly reactive, and thus, may react with a free solvent that is not bonded with lithium ions to cause an exothermic reaction. In this case, when a lithium salt of a high concentration is used in an electrolyte, the amount of the free solvent is reduced, thereby suppressing the exothermic reaction, so that the high-temperature safety and high-temperature lifespan properties of the battery may be improved.

Specifically, a lithium salt used in a lithium secondary battery may be used without any particular limitation as long as it is a compound capable of providing lithium ions. Specifically, the lithium salt includes $Li^+$ as a cation, and may use one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$, or, if necessary, a mixture of two or more thereof as an anion.

The electrolyte for a lithium secondary battery includes an oligomer including a unit represented by Formula A below.

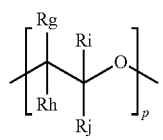

[Formula A]

In Formula A, $R_g$, $R_h$, $R_i$, and $R_j$ are each independently fluorine, or an alkyl group having 1 to 3 carbon atoms which is unsubstituted or substituted with fluorine, and p is an integer of 1 to 10.

Since the oligomer including a unit represented by Formula A contains a fluorine-substituted ethylene group having a low reactivity with lithium ions, a side reaction of lithium ions and a decomposition reaction of a lithium salt may be controlled, so that a side reaction may be suppressed even when a lithium salt of a high concentration is used. In addition, since the oligomer includes fluorine excellent in flame retardancy, when an electrolyte including the oligomer is used, the thermal safety of a lithium secondary battery may be improved.

Specifically, the oligomer including a unit represented by Formula A above may be an oligomer represented by Formula 1 below.

In Formula 1, $R_f$ is an alkylene group having 1 to 5 carbon atoms which is unsubstituted or substituted with fluorine, $R_g$, $R_h$, $R_i$, and $R_j$ are each independently fluorine, or an alkyl group having 1 to 3 carbon atoms which is unsubstituted or substituted with fluorine, $R_0$ is an aliphatic hydrocarbon group or an aromatic hydrocarbon group, R' is hydrogen or an alkyl group having 1 to 3 carbon atoms, and o is an integer of 1 to 3, p is an integer of 1 to 10, and q is an integer of 1 to 15.

In addition, in the oligomer represented by Formula 1, the aliphatic hydrocarbon group may include an alicyclic hydrocarbon group or a linear hydrocarbon group.

The alicyclic hydrocarbon group may include at least one selected from the group consisting of a substituted or unsubstituted cycloalkylene group having 4 to 20 carbon atoms, a substituted or unsubstituted cycloalkylene group containing an isocyanate group (NCO) having 4 to 20 carbon atoms, a substituted or unsubstituted cycloalkenylene group having 4 to 20 carbon atoms, and a substituted or unsubstituted heterocycloalkylene group having 2 to 20 carbon atoms.

The linear hydrocarbon group may include at least one selected from the group consisting of a substituted or unsubstituted alkylene group having 1 to 20 carbon atoms, a substituted or unsubstituted alkylene group containing an isocyanate group (NCO) having 1 to 20 carbon atoms, a substituted or unsubstituted alkoxylene group having 1 to 20 carbon atoms, a substituted or unsubstituted alkenylene group having 2 to 20 carbon atoms, and a substituted or unsubstituted alkynylene group having 2 to 20 carbon atoms.

In addition, in the oligomer represented by Formula 1, the aromatic hydrocarbon group may include a substituted or unsubstituted arylene group having 6 to 20 carbon atoms, or a substituted or unsubstituted heteroarylene group having 2 to 20 carbon atoms.

Meanwhile, the oligomer including a unit represented by Formula A above may be an oligomer represented by Formula 1a below.

[Formula 1]

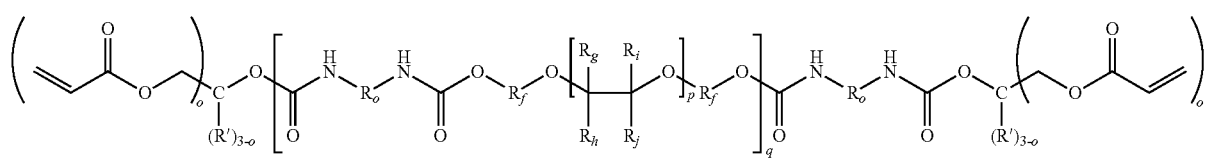

[Formula 1a]

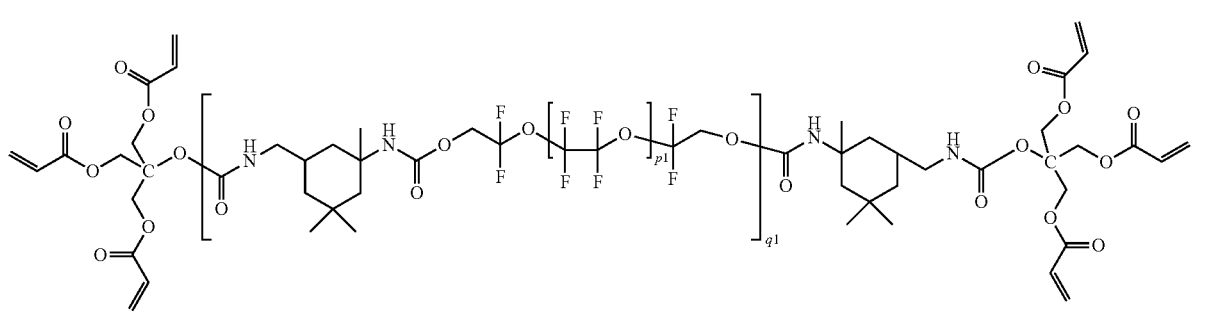

In Formula 1a, p1 is an integer of 1 to 10, and q1 is an integer of 1 to 15.

The oligomer represented by Formula 1 and the oligomer represented by Formula 1a include a unit represented by Formula A and maintain the properties thereof accordingly, while including an acrylate-based functional group which is a hydrophilic portion capable of forming a cross-linking bond on its own at both ends thereof and including a fluorine-substituted ethylene group which is a hydrophobic portion. Therefore, a surfactant role is further imparted in the battery to lower the surface resistance with an electrode interface. Accordingly, when the oligomer represented by Formula 1 and the oligomer represented by Formula 1a are used, the wetting effect of the lithium secondary battery may be improved.

At this time, the weight average molecular weight (Mw) of the oligomer represented by Formula 1 and the oligomer represented by Formula 1a may be controlled by the number of repeating units, and may be about 1,000 g/mol to 200,000 g/mol, specifically 1,000 g/mol to 150,000 g/mol, more specifically 1,000 g/mol to 100,000 g/mol. When the weight average molecular weight of the oligomer is in the above range, the affinity with the organic solvent is high so that the dispersion may be well achieved, the surface tension may be lowered below a predetermined level so that the wetting of the electrolyte may be improved, and a decomposition reaction of the lithium salt is prevented so that lithium ions may be prevented from causing a side reaction.

The weight average molecular weight may refer to a conversion value for a standard polystyrene measured by Gel Permeation Chromatography (GPC), and unless otherwise specified, molecular weight may refer to the weight average molecular weight. For example, in the present invention, the weight average molecular weight is measured using Agilent's 1200 series under GPC conditions, and a column used at this time may be Agilent's PL mixed B column and a solvent may be THF.

Meanwhile, the content of the oligomer including a unit represented by Formula A may be appropriately adjusted according to the type of an electrolyte for a lithium secondary battery used.

The electrolyte for a lithium secondary battery may be any one of a liquid electrolyte or a gel polymer electrolyte.

For example, when the electrolyte for a lithium secondary battery is a gel polymer electrolyte, the oligomer including a unit represented by Formula A may be included in an amount of 0.5 parts by weight to 20 parts by weight, preferably 1 part by weight to 15 parts by weight, more preferably 2 parts by weight to 15 parts by weight based on the 100 parts by weight of the electrolyte for a lithium secondary battery. When the oligomer including a unit represented by Formula A is included in the above range, a polymer network structure may be stably formed when the oligomer is cross-linked, and the wetting of the electrolyte may be maintained at a predetermined level or higher. Meanwhile, the mobility of lithium ions is improved and even though the viscosity is slightly increased by using a lithium salt of a high concentration, the ion conductivity of the lithium ions may be maintained at a predetermined level or higher.

Meanwhile, when the electrolyte for a lithium secondary battery is a gel polymer electrolyte, a polymerization initiator is further included. The polymerization initiator may be any typical polymerization initiator known in the art, and may be at least one selected from the group consisting of an azo-based compound, a peroxide-based compound, or a mixture thereof.

For example, the polymerization initiator may be an organic peroxide or a hydroperoxide such as benzoyl peroxide, acetyl peroxide, dilauryl peroxide, di-tert-butyl peroxide, t-butyl peroxy-2-ethyl-hexanoate, cumyl hydroperoxide, and hydrogen peroxide, or at least one azo compound selected from the group consisting of 2,2'-azobis (2-cyanobutane), dimethyl 2,2'-azobis (2-methylpropionate), 2,2'-azobis (methylbutyronitrile), 2,2'-azobis (iso-butyronitrile) (AIBN), and 2,2'-azobisdimethyl-valeronitrile (AMVN), but is not limited thereto.

The polymerization initiator may be included in an amount of 0.1 parts by weight to 5 parts by weight based on 100 parts by weight of the oligomer. When the polymerization initiator is included in the above range, the amount of residual unreacted polymerization initiator may be minimized, and the gelation of a predetermined level or higher may be achieved.

Meanwhile, when the electrolyte for a lithium secondary battery according to the present invention is a gel polymer electrolyte, the gel polymer electrolyte may be formed through a curing process. At this time, the curing process of a gel polymer electrolyte may be performed through E-BEAM, gamma rays, a room temperature/high-temperature aging process, or heat-curing. At this time, the curing takes about 2 minutes to 48 hours, and the temperature of heat-curing may be 40° C. to 100° C., specifically 40° C. to 80° C.

According to another embodiment, the electrolyte for a lithium secondary battery may be a liquid electrolyte, and the oligomer including a unit represented by Formula A may be included in an amount of 0.01 parts by weight to 1 part by weight, preferably 0.025 parts by weight to 0.75 parts by weight, more preferably 0.05 parts by weight to 0.75 parts by weight based on the 100 parts by weight of the electrolyte for a lithium secondary battery. When the oligomer including a unit represented by Formula A is included in the above range, the wetting of the electrolyte is improved, and the dissociation of a lithium salt may be increased.

The organic solvent includes a cyclic carbonate-based compound and an acetate-based compound. The cyclic carbonate-based compound may be included in an amount of 6 vol % to 19 vol %, preferably 6 vol % to 18 vol %, and more preferably 6 vol % to 17 vol % based on the total volume of the organic solvent.

A cyclic carbonate-based compound has a high dielectric constant, thereby dissociating a lithium salt to a high level, but has a relatively high viscosity since the charge deflection in a molecule is large. At this time, when the cyclic carbonate-based compound is included less than 6 vol % based on the total volume of the organic solvent, even when a lithium salt of a high concentration is used, the lithium salt is not dissociated well, so that the dissociation of the lithium salt may be deteriorated. Meanwhile, when the cyclic carbonate-based compound is included greater than 19 vol % based on the total volume of the organic solvent, the viscosity of the electrolyte is excessively increased, so that the mobility of dissociated lithium ions may be deteriorated. Accordingly, when a cyclic carbonate-based compound is included in an organic solvent in the above range, the viscosity of an electrolyte and the dissociation of a lithium salt may be maintained excellent.

For example, the cyclic carbonate-based compound may be one or more selected from the group consisting of ethylene carbonate, propylene carbonate, 1,2-butylene carbonate, 2,3-butylene carbonate, 1,2-pentylene carbonate, 2,3-pentylene carbonate, vinylene carbonate, fluoroethylene carbonate (FEC), and difluoroethylene carbonate (DFEC).

The acetate-based compound is a compound capable of improving the mobility of lithium ions due to the low viscosity thereof, and may be used together with the cyclic carbonate-based compound to improve the ion conductivity of an organic solvent to a predetermined level or higher. The acetate-based compound may be included in an amount of 81 vol % to 94 vol %, preferably 82 vol % to 94 vol %, and more preferably 83 vol % to 94 vol % based on the total volume of the organic solvent.

When the acetate-based compound is included in the above range, the acetate-based compound may be used together with the cyclic carbonate-based compound to provide an electrolyte for a lithium secondary battery having a dielectric constant of a high level and ion conductivity of a predetermined level or higher.

For example, the acetate-based compound may be one or more selected from the group consisting of methyl acetate, ethyl acetate, and propyl acetate.

Meanwhile, the electrolyte for a lithium secondary battery according to the present invention may further include an additive. Specifically, one or more compounds selected from the group consisting of propane sultone (PS), polyphenylene sulfide, succinitrile (SN), propenesultone (PRS), lithium difluoro (oxalato) borate (LiODFB), ethylene sulfate, adiponitrile, and lithium bis (oxalato) borate may b e used as the additive. As an additive, when the compounds listed above are used together, a stable film may be formed simultaneously on a positive electrode and a negative electrode. At this time, by the film formed on the negative electrode, the electrolyte is suppressed from being decomposed under high-temperature and high pressure conditions, and by the film formed on the positive electrode, a transition metal included in the positive electrode is suppressed from being eluted, so that the high-temperature and high-pressure properties and stability of the battery may be improved.

Lithium Secondary Battery

Next, a lithium secondary battery according to the present invention will be described. The lithium secondary battery according to an embodiment of the present invention includes a positive electrode containing a positive electrode active material represented by $Li_a(Ni_{x1}Co_{y1}Mn_{z1})O_2$ ($0.45 \leq x1 \leq 50.9$, $0.05 \leq y1 \leq 0.5$, $0.05 \leq z1 \leq 0.5$, $0.8 \leq a \leq 1.2$), a negative electrode, and the electrolyte for a lithium secondary battery. Meanwhile, the description of the electrolyte for a lithium secondary battery is the same as that described above, and thus, a detailed description thereof will be omitted.

The positive electrode may be prepared by coating positive electrode active material slurry including a positive electrode active material, a binder, a conductive material, and a solvent on a positive electrode current collector.

The positive electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used.

The positive electrode active material is a compound capable of reversible intercalation and de-intercalation of lithium and includes a lithium composite metal oxide, specifically a lithium composite metal oxide represented by $Li_a(Ni_{x1}Co_{y1}Mn_{z1})O_2$ ($0.45 \leq x \leq 0.9$, $0.05 \leq y1 \leq 0.5$, $0.05 \leq z1 \leq 0.5$, $0.85 \leq a \leq 1.2$) as a lithium-nickel-cobalt-transition metal (M) oxide. Preferably, the lithium-nickel-cobalt-transition metal (M) oxide may be represented by $Li_a(Ni_{x1}Co_{y1}Mn_{z1})O_2$ ($0.5 \leq x1 \leq 0.9$, $0.05 \leq y1 \leq 0.45$, $0.05 \leq z1 \leq 0.45$, $0.8 \leq a \leq 1.2$), more preferably $Li_a(Ni_{x1}Co_{y1}Mn_{z1})O_2$ ($0.55 \leq x1 \leq 0.9$, $0.05 \leq y1 \leq 0.4$, $0.05 \leq z1 \leq 0.4$, $0.8 \leq a \leq 1.2$). At this time, the range of a may be, preferably, represented by $0.9 \leq a \leq 1.1$, more preferably $0.95 \leq a \leq 1.05$.

When the lithium composite metal oxide is used, the capacity of a battery may be increased and energy density may be improved.

The positive electrode active material may be included in an amount of 60 wt % to 98 wt %, preferably 70 wt % to 98 wt %, more preferably 80 wt % to 98 wt % based on the total weight of a solid excluding the solvent from the positive electrode active material slurry.

The binder is a component for assisting in bonding between an active material and a conductive material, and bonding to a current collector. Typically, the binder may be included in an amount of 1 wt % to 20 wt %, preferably 1 wt % to 15 wt %, more preferably 1 wt % to 10 wt % based on the total weight of a solid excluding the solvent from the positive electrode active material slurry.

Examples of the binder may include polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene (PE), polypropylene, an ethylene-propylene-diene monomer (EPDM), a sulfonated EPDM, styrene butylene rubber, fluorine rubber, various copolymers thereof, and the like.

The conductive material is a component for further improving the conductivity of a positive electrode active material, and may be included in an amount of 1 wt % to 20 wt %, preferably 1 wt % to 15 wt %, more preferably 1 wt % to 10 wt % based on the total weight of a solid excluding the solvent from the positive electrode active material slurry.

The conductive material is not particularly limited as long as it has conductivity without causing a chemical change in the battery. Examples of the conductive material may include graphite; a carbon-based material such as carbon black, acetylene black, Ketjen black, channel black, furnace black, lamp black, and thermal black; a conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like. Specific examples of a commercially available conductive material may include acetylene black series (products of Chevron Chemical Company), Denka black (product of Denka Singapore Private Limited, Gulf Oil Company, etc.), Ketjen black, EC series (product of Armak Company), Vulcan XC-72 (product of Cabot Company), and Super P (product of Timcal company).

The solvent may include an organic solvent such as N-methyl-2-pyrrolidone (NMP), and may be used in an amount such that a preferred viscosity is achieved when the positive electrode active material, and optionally, a binder and a conductive material, and the like are included. For example, the solvent may be included in an amount such that the concentration of a solid including the positive electrode active material, and optionally a binder and a conductive material is 50 wt % to 95 wt %, preferably 55 wt % to 90 wt %, more preferably 60 wt % to 90 wt %.

The negative electrode may be prepared, for example, by coating negative electrode active material slurry including a negative electrode active material, a binder, a conductive material, and a solvent on a negative electrode current collector.

The negative electrode current collector typically has a thickness of 3 μm to 500 μm. The negative electrode current collector is not particularly limited as long as it has high conductivity without causing a chemical change in the battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, as in the case of the positive electrode current collector, microscopic irregularities may be formed on the surface of the negative electrode current collector to improve the coupling force of a negative electrode active material, and the negative electrode current collector may be used in various forms of such as a film, a sheet, a foil, a net, a porous body, a foam body, and a non-woven fabric body.

Examples of the negative electrode active material may include one or two or more kinds of negative electrode active materials selected from the group consisting of natural graphite, artificial graphite, a carbonaceous material; a lithium-containing titanium composite oxide (LTO); a metal (Me) such as Si, Sn, Li, Zn, Mg, Cd, Ce, Ni or Fe; an alloy composed of the metal (Me); an oxide (Meox) of the metal (Me); and a composite of the metal (Me) and carbon.

Among the above, the negative electrode active material may include at least one selected from the group consisting of $SiO_{x2}$ ($0 \leq x2 \leq 2$) and SiC. When the compounds are included as a negative electrode active material, there is an advantage in that the energy density of a lithium secondary battery may be increased due to high capacity, but there is a problem in that the battery expands during charging and discharging. At this time, when a lithium salt is used in the concentration range according to the present invention, a more stable solid electrolyte interface (SEI) film is formed on the surface of a negative electrode so that during charging and discharging of a lithium secondary battery, even when Si is included, the expansion of the volume of the negative electrode is suppressed to prevent the deterioration in the lifespan of the battery.

The negative electrode active material may be included in an amount of 60 wt % to 98 wt %, preferably 70 wt % to 98 wt %, more preferably 80 wt % to 98 wt % based on the total weight of a solid excluding the solvent from the negative electrode active material slurry.

The binder is a component for assisting in bonding between a conductive material, an active material, and a current collector, and may be typically included in an amount of 1 wt % to 20 wt %, preferably 1 wt % to 15 wt %, more preferably 1 wt % to 10 wt % based on the total weight of a solid excluding the solvent from the negative electrode active material slurry.

Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber, fluorine rubber, various copolymers thereof, and the like.

The conductive material is a component for further improving the conductivity of a negative electrode active material, and may be added in an amount of 1 wt % to 20 wt %, preferably 1 wt % to 15 wt %, more preferably 1 wt % to 10 wt % based on the total weight of a solid excluding the solvent from the negative electrode active material slurry.

The conductive material is not particularly limited as long as it has conductivity without causing a chemical change in the battery. For example, graphite such as natural graphite or artificial graphite; carbon black such as acetylene black, Ketjen black, channel black, furnace black, lamp black, and thermal black; conductive fiber such as carbon fiber and metal fiber; a metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like may be used.

The solvent may include water (distilled water) or an organic solvent such as N-methyl-2-pyrrolidone (NMP), and may be used in an amount such that a preferred viscosity is achieved when the negative electrode active material, and optionally, a binder, a conductive material, and the like are included. For example, the solvent may be included in an amount such that the concentration of a solid including the negative electrode active material, and optionally a binder and a conductive material is 50 wt % to 95 wt %, preferably 55 wt % to 90 wt %, more preferably 60 wt % to 90 wt %.

As the separator, a porous polymer film which has been typically used as a separator, for example, a porous polymer film prepared with a polyolefin-based polymer, such as an ethylene homopolymer, a propylene homopolymer, an ethylene-butene copolymer, an ethylene-hexene copolymer, and an ethylene-methacrylate copolymer may be used alone, or in a laminated form thereof. Alternatively, a typical porous non-woven fabric, for example, a non-woven fabric formed of a glass fiber having a high melting point or polyethylene terephthalate fiber may be used, but the present invention is not limited thereto.

MODE FOR CARRYING OUT THE INVENTION

Hereinafter, the present invention will be described in more detail with reference to specific examples. However, the following examples are merely illustrative of the present invention and are not intended to limit the scope of the present invention. It will be apparent to those skilled in the art that various changes and modifications can be made without departing from the scope and spirit of the invention, and it is obvious that such variations and modifications are within the scope of the appended claims.

Preparation of Liquid Electrolyte for Lithium Secondary Battery and Composition for Gel Polymer Electrolyte

1. Example 1

To an organic solvent containing ethylene carbonate (EC): ethyl acetate (EA) in a volume ratio of 1:9, an oligomer (weight average molecular weight (Mw): 5,000 g/mol, p1=5, q1=10) represented by Formula 1a was added so as to be 0.5 parts by weight based on 100 parts by weight of a liquid electrolyte for a lithium secondary battery, and then $LiPF_6$ was added thereto to a concentration of 2 M to prepare a liquid electrolyte for a lithium secondary battery.

2. Example 2

When preparing an electrolyte for a lithium secondary battery, a liquid electrolyte for a lithium secondary battery was prepared in the same manner as in Example 1 except that a lithium salt was added to a concentration of 3 M.

3. Example 3

To an organic solvent containing ethylene carbonate (EC): ethyl acetate (EA) in a volume ratio of 1:9, an oligomer (weight average molecular weight (Mw): 5,000 g/mol, p1=5, q1=10) represented by Formula 1a was added so as to be 5 parts by weight based on 100 parts by weight of composition for a gel polymer electrolyte for a lithium secondary battery, and then 0.4 parts by weight of 2,2'-azobis(isobutyronitril) (AIBN) based on 100 parts by weight of the oligomer was added thereto as a polymerization initiator, followed by adding $LiPF_6$ to a concentration of 2 M to prepare a composition for a gel polymer electrolyte for a lithium secondary battery.

4. Example 4

When preparing an electrolyte for a lithium secondary battery, a composition for a gel polymer electrolyte for a lithium secondary battery was prepared in the same manner as in Example 3 except that 10 parts by weight of the oligomer represented by Formula 1a was added.

5. Example 5

When preparing an electrolyte for a lithium secondary battery, a composition for a gel polymer electrolyte for a lithium secondary battery was prepared in the same manner as in Example 3 except that a lithium salt was added to a concentration of 3 M.

6. Comparative Example 1

When preparing an electrolyte for a lithium secondary battery, a liquid electrolyte for a lithium secondary battery was prepared by, to an organic solvent containing ethylene carbonate (EC):ethyl methyl carbonate (EMC) in a volume ratio of 3:7, adding $LiPF_6$ to a concentration of 1 M.

7. Comparative Example 2

When preparing an electrolyte for a lithium secondary battery, a liquid electrolyte for a lithium secondary battery was prepared in the same manner as in Example 1 except that $LiPF_6$ was added to a concentration of 1 M.

8. Comparative Example 3

When preparing an electrolyte for a lithium secondary battery, a liquid electrolyte for a lithium secondary battery was prepared in the same manner as in Example 1 except that $LiPF_6$ was added to a concentration of 5.5 M.

9. Comparative Example 4

When preparing an electrolyte for a lithium secondary battery, a liquid electrolyte for a lithium secondary battery was prepared in the same manner as in Example 1 except that the oligomer represented by Formula 1a was not added.

10. Comparative Example 5

When preparing an electrolyte for a lithium secondary battery, a liquid electrolyte for a lithium secondary battery was prepared in the same manner as in Example 1 except that ethyl acetate (EA) was used alone as an organic solvent.

11. Comparative Example 6

When preparing an electrolyte for a lithium secondary battery, a liquid electrolyte for a lithium secondary battery was prepared in the same manner as in Example 1 except that an organic solvent containing ethylene carbonate (EC): ethyl acetate (EA) in a volume ratio of 3:7 is used.

12. Comparative Example 7

When preparing an electrolyte for a lithium secondary battery, a composition for a gel polymer electrolyte for a lithium secondary battery was prepared in the same manner as in Example 3 except that ethyl acetate (EA) was used alone as an organic solvent.

The compositions of the liquid electrolyte for a lithium secondary battery and the composition for a gel polymer electrolyte for a lithium secondary battery according to each of Examples 1 to 5 and Comparative Examples 1 to 7 are shown in Table 1 below.

TABLE 1

|  | Concentration of lithium salt (M) | EC (vol %) | EA (vol %) | Oligomer (parts by weight) | Initiator (AIBN) (parts by weight based on oligomer) |
|---|---|---|---|---|---|
| Examples 1 | 2 | 10 | 90 | 0.5 |  |
| Examples 2 | 3 | 10 | 90 | 0.5 |  |
| Examples 3 | 2 | 10 | 90 | 5 | 0.4 |
| Examples 4 | 2 | 10 | 90 | 10 | 0.4 |
| Examples 5 | 3 | 10 | 90 | 5 | 0.4 |
| Comparative Example 1 | 1 | EC:EMC = 3:7 (Volume ratio) |  | — |  |
| Comparative Example 2 | 1 | 10 | 90 | 0.5 |  |

TABLE 1-continued

|  | Concentration of lithium salt (M) | EC (vol %) | EA (vol %) | Oligomer (parts by weight) | Initiator (AIBN) (parts by weight based on oligomer) |
|---|---|---|---|---|---|
| Comparative Example 3 | 5.5 | 10 | 90 | 0.5 | |
| Comparative Example 4 | 2 | 10 | 90 | — | |
| Comparative Example 5 | 2 | — | 100 | 0.5 | |
| Comparative Example 6 | 2 | 30 | 70 | 0.5 | |
| Comparative Example 7 | 2 | — | 100 | 5 | 0.4 |

[Manufacturing of Lithium Secondary Battery]

1. Example 6

(1) Preparation of Positive Electrode

To N-methyl-2-pyrrolidone (NMP), which is a solvent, a positive electrode active material (($Li(Ni_{0.8}Co_{0.1}Mn_{0.1})O_2$), NCM811):conductive material (bundle-type carbon nanotubes):binder (polyvinylidene fluoride (PVDF)) were mixed at a weight ratio of 97.7:0.3:2 to prepare positive electrode active material slurry. The positive electrode active material slurry was applied to a positive electrode current collector (Al thin film) having a thickness of 20 µm, dried and then roll pressed to prepare a positive electrode.

(2) Preparation of Negative Electrode

To distilled water, which is a solvent, a negative electrode active material (graphite (AGP8)):conductive material (carbon black):binder (polyvinylidene fluoride (PVDF)) were mixed at a weight ratio of 97:0.5:2.5 to prepare negative electrode active material slurry. The negative electrode active material slurry was applied to a negative electrode current collector (Cu thin film) having a thickness of 10 µm, dried and then roll pressed to prepare a negative electrode.

(3) Manufacturing of Lithium Secondary Battery

The positive electrode and the negative electrode prepared as described above were sequentially stacked in the order of positive electrode/separator/negative electrode using a polyethylene porous film as the separator to manufacture an electrode assembly. The electrode assembly was received in a pouch-type secondary battery case, and into the pouch-type secondary battery case, the liquid electrolyte for a lithium secondary battery according to Example 1 was injected to manufacture a lithium secondary battery.

2. Example 7

A lithium secondary battery was manufactured in the same manner as in Example 6 except that the liquid electrolyte for a lithium secondary battery according to Example 2 was used as an electrolyte for a lithium secondary battery.

3. Example 8

A positive electrode and a negative electrode were prepared in the same manner as in Example 6, and the prepared positive electrode and the negative electrode were sequentially stacked together with a polyethylene porous film to manufacture an electrode assembly. The electrode assembly was received in a pouch-type secondary battery case, and into the pouch-type secondary battery case, the composition for a gel polymer electrolyte for a lithium secondary battery according to Example 3 was injected, followed by heat-curing for 5 hours at 65° C. to manufacture a lithium secondary battery.

4. Example 9

A lithium secondary battery was manufactured in the same manner as in Example 8 except that the composition for a gel polymer electrolyte for a lithium secondary battery according to Example 4 was used as a composition for a gel polymer electrolyte for a lithium secondary battery.

5. Example 10

A lithium secondary battery was manufactured in the same manner as in Example 8 except that the composition for a gel polymer electrolyte for a lithium secondary battery according to Example 5 was used as a composition for a gel polymer electrolyte for a lithium secondary battery.

6. Comparative Example 8

A lithium secondary battery was manufactured in the same manner as in Example 6 except that the liquid electrolyte for a lithium secondary battery according to Comparative Example 1 was used as an electrolyte for a lithium secondary battery.

7. Comparative Example 9

A lithium secondary battery was manufactured in the same manner as in Example 6 except that the liquid electrolyte for a lithium secondary battery according to Comparative Example 4 was used as an electrolyte for a lithium secondary battery.

8. Comparative Example 10

A lithium secondary battery was manufactured in the same manner as in Example 6 except that the liquid electrolyte for a lithium secondary battery according to Comparative Example 5 was used as an electrolyte for a lithium secondary battery.

9. Comparative Example 11

A lithium secondary battery was manufactured in the same manner as in Example 8 except that the composition for a gel polymer electrolyte for a lithium secondary battery according to Comparative Example 7 was used as an electrolyte for a lithium secondary battery.

EXPERIMENTAL EXAMPLE

1. Experimental Example 1: Evaluation of Ion Conductivity

The ion conductivity of the liquid electrolyte for a lithium secondary battery prepared in each of Examples 1 and 2 and Comparative Examples 1 to 6 was measured. The ion conductivity was measured by measuring the ion conductivity at room temperature (25° C.) and at a low temperature (−10° C.) using an ion conductivity measuring device in a probe type (Probe: InLab 731, model: S470, Manufacturer: Mettler Torodo).

The composition for a gel polymer electrolyte for a lithium secondary battery prepared in each of Examples 3 to 5 and Comparative Example 7 was coated on a conductive glass substrate in a band type, heat-cured for 5 hours at 65° C., and then sufficiently dried. Thereafter, a platinum (Pt) electrode was coated in a circular shape with a diameter of 1 mm on an upper portion of each film by using a sputter method under an argon atmosphere, and the ionic conductivity at room temperature (25° C.) and at a low temperature (−10° C.) was measured at 18° C. using an alternating impedance measurement method. The ion conductivity was measured in a frequency band of 100 MHz to 0.1 Hz using a VMP3 measuring device and 4294A. The measured ion conductivity is shown in Table 2 below.

TABLE 2

| | Ion conductivity (25° C., mS/cm) | Ion conductivity (−10° C., mS/cm) |
|---|---|---|
| Examples 1 | 9.8 | 3.9 |
| Examples 2 | 11.1 | 4.3 |
| Examples 3 | 8.5 | 3.5 |
| Examples 4 | 8.1 | 3.2 |
| Examples 5 | 9.0 | 4.0 |
| Comparative Examples 1 | 9.3 | 2.7 |
| Comparative Examples 2 | 3.5 | Unable to measure |
| Comparative Examples 3 | Unable to measure | Unable to measure |
| Comparative Examples 5 | 8.5 | 2.8 |
| Comparative Examples 6 | 4.5 | Unable to measure |
| Comparative Examples 7 | 7.5 | 2.2 |

In the case of Examples 1 and 2, it can be confirmed that the movement of lithium ions smoothly occurred due to the low viscosity of ethyl acetate (EA) so that the ion conductivity at room temperature and at the low temperature was greatly improved compared with that of Comparative Example 1.

In the case of Examples 3 to 5, it can be seen that the movement properties of lithium ions were lowered due to a polymer matrix in the gel polymer electrolyte so that the ion conductivity at room temperature was lower but was higher at the low temperature than that of Comparative Example 1. This is because the polymer matrix lowers the freezing point of the electrolyte to improve the dissociation of lithium ions.

In the case of Comparative Example 2, the concentration of the lithium salt was low so that the ion conductivity at room temperature was significantly lower than that of Examples. In addition, it can be confirmed that when the concentration of the lithium salt is low, the freezing point of the electrolyte is not lowered, so that the electrolyte is frozen and the movement of lithium ions does not occur, and thus, the ion conductivity cannot be measured.

In the case of Comparative Example 3, the dissociation of the lithium salt was low so that the ion conductivity could not be measured. In the case of Comparative Example 6, the viscosity of the electrolyte was high due to the high content of ethylene carbonate (EC) so that the ion conductivity at room temperature was significantly lower than that of Examples and the electrolyte was frozen at the low temperature so that the ion conductivity could not be measured.

Meanwhile, in the case of Comparative Examples 5 and 7, it can be confirmed that since the organic solvent did not include ethylene carbonate (EC), the dissociation of the lithium salt was lowered, so that the ion conductivity was lower than that of Examples.

2. Experimental Example 2: Measurement of Initial Capacity and Resistance

The lithium secondary battery manufactured in each of Examples 6 and 9 and Comparative Examples 8 to 11 was subjected to formation with a current of 14 mA (0.1 C rate), and then was subjected to CC/CV charge of 4.2 V, 47 mA (0.33 C, 0.05 C cut-off) and CC discharge of 3 V, 47 mA (0.33 C) three times. At this time, the third discharge capacity was defined as an initial capacity.

After the initial capacity was measured, the voltage drop occurred when a fully-charged lithium secondary battery was discharged for 10 seconds with a current of 350 mA (2.5 C) at room temperature (25° C.) and at a low temperature (−10° C.) respectively was recorded, and a DC resistance value calculated using R=V/I (Ohm's Law) was defined as an initial resistance. The results are shown in Table 3 below.

TABLE 3

| | Initial capacity (mAh) | Room temperature initial resistance (Ohm) | low temperature initial resistance (Ohm) |
|---|---|---|---|
| Examples 6 | 142 | 0.08 | 0.32 |
| Examples 7 | 143 | 0.06 | 0.24 |
| Examples 8 | 141 | 0.09 | 0.55 |
| Examples 9 | 140 | 0.1 | 0.65 |
| Comparative Examples 8 | 139 | 0.12 | 0.75 |
| Comparative Examples 9 | 128 | 0.25 | 1> |
| Comparative Examples 10 | 100 | 0.33 | 1> |
| Comparative Examples 11 | 110 | 0.36 | 1> |

In the case of Examples 6 to 9, it can be seen that the initial capacity and the room temperature/low temperature resistance were improved compared with Comparative Examples due to high ion transfer properties.

3. Experimental Example 3: Evaluation of Battery Cycle Properties at Room Temperature and High Temperatures The lithium secondary battery manufactured in each of Examples 6 and 9 and Comparative Examples 8 to 11 was subjected to formation with a current of 14 mA (0.1 C rate), and then the discharge capacity at this time was defined as an initial capacity. Thereafter, CC/CV charge of 4.2 V, 47 mA (0.33 C, 0.05 C cut-off) and CC discharge of 3 V, 47 mA (0.33 C) were performed 50 times at room temperature (25° C.) and at a high temperature (45° C.), respectively. Thereafter, the 50$^{th}$ discharge capacity at room temperature and at the high temperature were respectively compared with the initial capacity to calculate each capacity retention rate. The results are shown in Table 4.

TABLE 4

| | the capacity retention rate at room temperature (%) | the capacity retention rate at high temperature (%) |
|---|---|---|
| Examples 6 | 98 | 96 |
| Examples 7 | 99 | 97 |
| Examples 8 | 98 | 94 |
| Examples 9 | 98 | 95 |
| Comparative Examples 8 | 95 | 88 |

TABLE 4-continued

|  | the capacity retention rate at room temperature (%) | the capacity retention rate at high temperature (%) |
|---|---|---|
| Comparative Examples 9 | 70 | 10< |
| Comparative Examples 10 | 50 | 10< |
| Comparative Examples 11 | 60 | 10< |

In the case of Examples, since the concentration of the lithium salt was high, the content of an undissociated solvent (free solvent) in the electrolyte was reduced, so that the capacity retention rate at room temperature was high. In addition, in the case of Examples, it can be confirmed that since ethyl acetate (EA) having a low dielectric constant was included as an organic solvent to suppress the dissociation and elution of a transition metal (particularly, the elution of Ni was suppressed), the battery capacity retention rate was improved.

In the case of Comparative Example 9, it can be confirmed that since the electrolyte for a lithium secondary battery did not include an oligomer, the wetting of the electrolyte was lowered, so that the capacity retention rate was lower than that of Examples. In the case of Comparative Examples 10 and 11, it can be confirmed that since the organic solvent did not include ethylene carbonate (EC), the dissociation of the lithium salt was low, so that the capacity retention rate was lower than that of Examples.

The invention claimed is:

1. An electrolyte for a lithium secondary battery comprising:
    a lithium salt, wherein the lithium salt is present in the electrolyte at a concentration of 1.6 M to 5 M;
    an oligomer including a unit represented by Formula A below; and
    an organic solvent including a cyclic carbonate-based compound and an acetate-based compound,
    wherein the cyclic carbonate-based compound is present in an amount of 6 volume percent (vol %) to 19 vol % based on the total volume of the organic solvent,
    wherein the acetate-based compound is present in an amount of 81 vol % to 94 vol % based on the total volume of the organic solvent,
    wherein the oligomer is present in an amount of 0.01 parts by weight to 1 parts by weight based on 100 parts by weight when the electrolyte is a liquid electrolyte, and
    wherein the oligomer is present in an amount of 0.5 parts by weight to 20 parts by weight based on 100 parts by weight when the electrolyte is a gel polymer electrolyte:

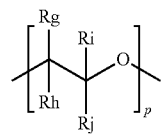

[Formula A]

wherein, in Formula A, $R_g$, $R_h$, $R_i$ and $R_j$ are each independently fluorine, or an alkyl group having 1 to 3 carbon atoms which is unsubstituted or substituted with fluorine, and p is an integer of 1 to 10.

2. The electrolyte of claim 1, wherein the oligomer is represented by Formula 1 below:

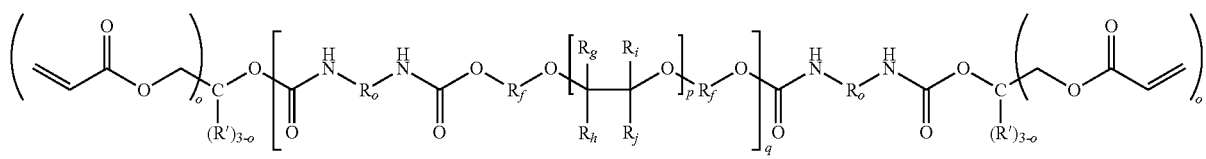

[Formula 1]

wherein, in Formula 1,
$R_f$ is an alkylene group having 1 to 5 carbon atoms which is unsubstituted or substituted with fluorine,
$R_g$, $R_h$, $R_i$ and $R_j$ are each independently fluorine, or an alkyl group having 1 to 3 carbon atoms which is unsubstituted or substituted with fluorine,
$R_o$ is an aliphatic hydrocarbon group or an aromatic hydrocarbon group,
R' is hydrogen or an alkyl group having 1 to 3 carbon atoms, and
o is an integer of 1 to 3, p is an integer of 1 to 10, and q is an integer of 1 to 15.

3. The electrolyte of claim 1, wherein the electrolyte is a gel polymer electrolyte.

4. The electrolyte of claim 1, wherein the electrolyte is a liquid electrolyte.

5. The electrolyte of claim 1, wherein the oligomer is represented by Formula 1a below:

[Formula 1a]

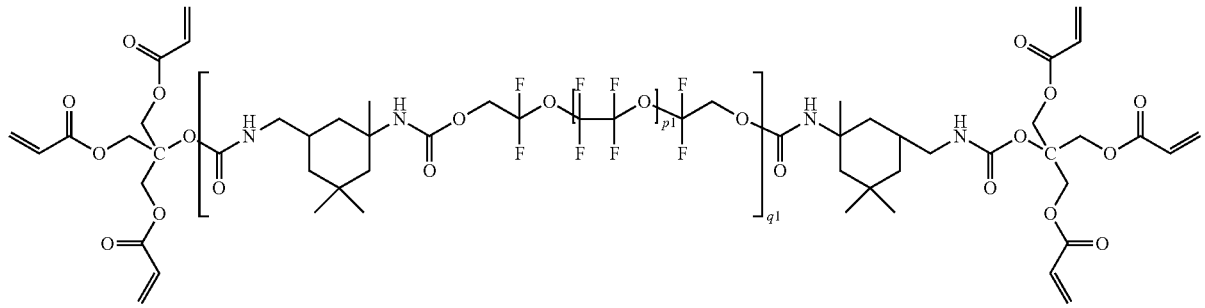

wherein, in Formula 1a,
p1 is an integer of 1 to 10, and
q1 is an integer of 1 to 15.

6. The electrolyte of claim 1, wherein the organic solvent consists of the cyclic carbonate-based compound and the acetate-based compound.

7. The electrolyte of claim 1, wherein the cyclic carbonate-based compound is one or more selected from the group consisting of ethylene carbonate, propylene carbonate, 1,2-butylene carbonate, 2,3-butylene carbonate, 1,2-pentylene carbonate, 2,3-pentylene carbonate, vinylene carbonate, fluoroethylene carbonate, and difluoroethylene carbonate.

8. The electrolyte of claim 1, wherein the acetate-based compound is one or more selected from the group consisting of methyl acetate, ethyl acetate, and propyl acetate.

9. A lithium secondary battery, comprising:
a positive electrode including a positive electrode active material represented by $Li_a(Ni_{x1}Co_{y1}Mn_{z1})O_2$ ($0.45 \leq x1 \leq 50.9$, $0.05 \leq y1 \leq 0.5$, $0.05 \leq z1 \leq 0.5$, $0.8 \leq a \leq 1.2$);
a negative electrode;
a separator; and
an electrolyte of claim 1.

* * * * *

UNITED STATES PATENT AND TRADEMARK OFFICE
CERTIFICATE OF CORRECTION

| | |
|---|---|
| PATENT NO. | : 11,489,203 B2 |
| APPLICATION NO. | : 16/771561 |
| DATED | : November 1, 2022 |
| INVENTOR(S) | : Won Kyung Shin et al. |

It is certified that error appears in the above-identified patent and that said Letters Patent is hereby corrected as shown below:

On the Title Page

Item (72) Inventors: Change "Chui Haeng Lee" to --Chul Haeng Lee--

Signed and Sealed this
Thirteenth Day of December, 2022

Katherine Kelly Vidal
*Director of the United States Patent and Trademark Office*